United States Patent

Itakura et al.

[11] 4,099,544
[45] Jul. 11, 1978

[54] VENT VALVE OF AN AIR PUMP

[76] Inventors: Tsuyoshi Itakura, Itakura Soki Kabushiki Kaisha, 17-20, Unoki 3-Chome, Ohta-ku, Tokyo, Japan; Allan H. Willinger, Willinger Bros., Inc., 351 E. 84th St., Apt. 22A, New York, N.Y. 10028

[21] Appl. No.: 765,792

[22] Filed: Feb. 4, 1977

[30] Foreign Application Priority Data

Oct. 26, 1976 [JP] Japan .............. 51-143046[U]

[51] Int. Cl.² ........................................... F16K 15/14
[52] U.S. Cl. ................................. 137/856; 417/413
[58] Field of Search .............. 137/855, 856, 857, 858; 417/413

[56] References Cited

U.S. PATENT DOCUMENTS

| 3,005,523 | 10/1961 | May | 137/855 X |
| 3,671,151 | 6/1972 | Duke et al. | 417/413 X |
| 3,825,374 | 7/1974 | Kondo | 417/413 |

Primary Examiner—William R. Cline
Attorney, Agent, or Firm—Friedman, Goodman & Teitelbaum

[57] ABSTRACT

A vent valve of an air pump for charging air into a fish bowl which comprises a separator wall having an insertion vent hole, a valve body made of a silicone rubber and consisting of a disc-shaped tongue section having a semi-circular portion of a small diameter for closing said insertion vent hole and an annular disc-shaped fixed section of a large diameter connected to the base portion of said tongue section.

3 Claims, 2 Drawing Figures

U.S. Patent July 11, 1978 4,099,544

VENT VALVE OF AN AIR PUMP

This invention relates to a vent valve of an air pump for feeding air into a fish bowl.

The primary object of the present invention is to provide a vent valve which has a simplified construction, works stably and possesses an extremely long service life.

The vent valve in accordance with the present invention comprises a separator wall having an insertion vent hole defined thereon; a valve body made of a silicone rubber and consisting of a disc-shaped tongue section having a semi-circular portion of a small diameter for closing the above-mentioned insertion vent hole and an annular disc-shaped fixed section of a large diameter connected to the base portion of the tongue section, each of the tongue section and fixed section being disposed in contact with the surface of said separator wall; and a support member made of a rubber, retained by the retaining section of said separator wall and abutting against the fixed section of the valve body.

Figure 1:
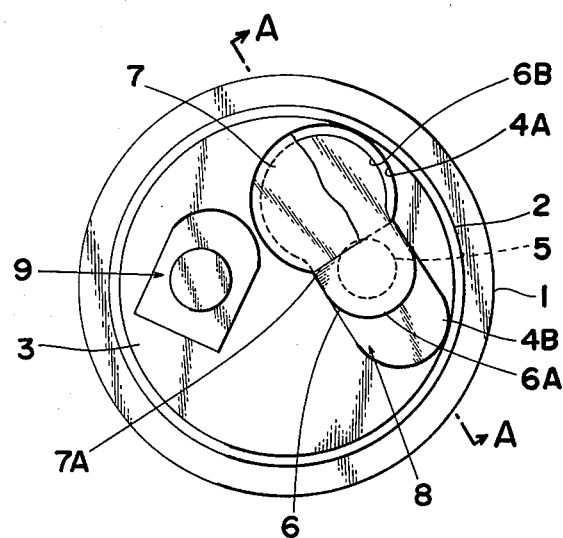
Figure 2:
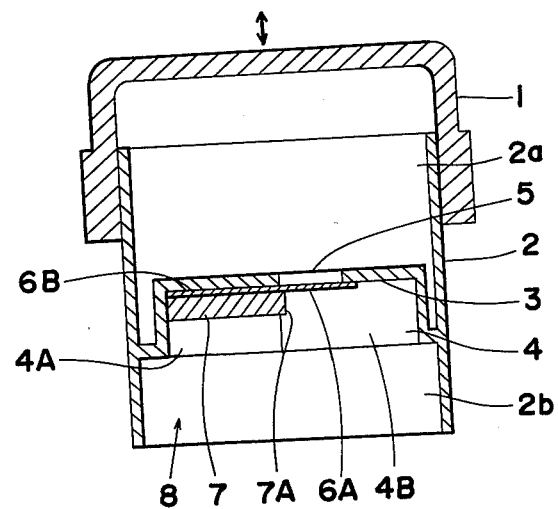

Other objects and features of the device of the invention will be apparent from the following detailed description when read in conjunction with the accompanying drawing, in which:

FIG. 1 is a bottom view of the air pump embodying the principal features of the present invention; and FIG. 2 is a sectional view taken along the line A—A of FIG. 1.

As shown in FIGS. 1 and 2, a vibration membrane 1 is connected to a driving mechanism (not shown) to cause vibration vertically as indicated by arrows and adapted to the main body 2 of the air pump. Inside the main body 2 is disposed a separator wall 3 which divides the air chamber thereof into an inner spacing 2a and an outer spacing 2b. A concave 4 is defined on the bottom surface of the separator wall 3 in a manner such that the shape of the bottom surface of the concave 4 includes a substantially annular section 4A and a narrow section 4B smaller than the diameter of the annular section 4A and connected therewith.

An insertion vent hole 5 is bored through the above-mentioned separator wall 3 so as to be located at the narrow section 4B.

On the other hand, a valve body 6 of a guitar-like shape is made of a material such as a 0.3-0.5 mm thick silicone rubber plate, for example, and consists of a disc-shaped tongue section 6A having a semi-circular portion of a diameter smaller than the width of the narrow section 4B of the concave 4 but larger than the diameter of the insertion vent hole 5, and a substantially disc-shaped fixed section 6B of a diameter slightly smaller than that of the above-mentioned annular section 4A but larger than the width of the narrow section 4B.

The fixed section 6B is connected to the base portion of the tongue section 6A, and abuts against the lower surface 3 inside the annular section 4A of the concave 4 so that the tongue section 6A closes the insertion vent hole 5. Inside the annular section 4A of the concave 4, furthermore, a rubber support member 7 having a shape corresponding to the concave is pushed thereinto from below and retained along the side wall thereof so that the fixed section 6B of the valve body 6 is fixed to the bottom surface of the concave 4 in intimate contact with the same, and a linear edge 7A of the support member 7 closes a part of the opening of the insertion vent hole 5 via the valve body 6.

The vent valve of the air pump is constructed in the above-mentioned manner. On the upper surface of the separator wall there is defined a similar concave (not shown) separately which forms an intake valve together with a valve body and a support member each having the structure same with the one mentioned previously. A reference numeral 8 indicates a vent port connected to the concave 4 that forms the afore-mentioned vent valve, and a reference numeral 9 denotes an intake port that corresponds to the intake valve.

In an embodiment of the present invention, the definite dimension is as follows:

diameter of the insertion vent hole 5—2.5 mm
thickness of the valve body 6—0.4 mm
diameter of the fixed section 6B—6 mm
maximum distance of the linear edge 7 protruding inwardly to the insertion vent hole 5—0.5-0.7 mm Since the device of the present invention has the construction as mentioned above, the reciprocating vertical motion of the vibration membrane 1 causes the change in pressure inside the inner spacing 2a of the air chamber of the pump main body whereby the portion of the tongue section 6A of the valve body 6 not covered by the support member 7 departs from the bottom surface of the separator wall 3 in response to the pressure inside the air chamber, and opens the insertion vent hole 5 and closes the same by means of its own righting force. In this manner, it performs the function of an one-way valve and causes the vent valve to open and close the insertion vent hole 5 through its vibrating action.

Because the device of this invention uses a silicone rubber as the material for the valve body 6, degradation of the same due to its opening and closing actions, that is to say, due to the vibration, is extremely small. On the other hand, an ordinary electromagnet mechanism is incorporated in the same casing and used as a driving mechanism for the vibration membrane 1. This mechanism heats the valve body 6 to a considerably high temperature, but the valve body 6 is not affected adversely because its material has also excellent heat resistance.

In addition, since the material of the valve body 6 has a proper stiffness, it is never sucked and caved into the insertion vent hole 5 at a reverse pressure opposite to the case when the valve body 6 is opened. Hence, the valve does not become out of operation. These actions are never obtained by the use of materials such as a natural rubber, for example.

As the valve body 6 of the present invention has a guitar-like shape, the connecting section of the tongue section 6A with the fixed section 6B is imparted with a certain roundness. For this reason, the connection has a large mechanical strength and is easy and inexpensive to fabricate. Also, the positioning of the support member 7 can be made easily. This leads to the saving of cost of production.

Though the vent valve for an air pump in accordance with the present invention has an extremely simplified construction as hereinbefore described, it hardly exhibits degradation due to vibration of the valve body, ambient conditions and aging, and ensures stable operation over an extremely extended period of time without problems.

What is claimed is:

1. A vent valve of an air pump comprising:

a separator wall dividing a main body of the air pump into an inner air chamber and an outer air chamber, said separator wall having an insertion vent hole for air flow communication between said inner and outer air chambers;

a valve body consisting of silicone rubber, said valve body including a disc-shaped tongue section and an annular disc-shaped fixed section to define a guitar-like shaped member, said tongue section having a semi-circular portion connected to a base portion, said base portion of said tongue section being connected to said fixed section to provide a one-piece valve body member, said tongue section having a diameter larger than said insertion vent hole for closing said insertion vent hole, said fixed section having a diameter larger than said tongue section diameter;

said tongue and fixed sections being disposed in contact against a surface of said separator wall with said tongue section closing said insertion vent hole;

a support member consisting of a rubber material, said support member being retained by a retaining section of said separator wall in an abutting position against said fixed section of said valve body so that said fixed section is sandwiched between said separator wall and said support member; and an edge of said support member extending to said tongue section to a position across said insertion vent hole so that an edge portion of said support member closes a portion of said insertion vent hole.

2. A vent valve as claimed in claim 1, wherein said valve body has a thickness of between 0.3 and 0.5 mm.

3. A vent valve as claimed in claim 1, wherein said insertion vent hole has a diameter of approximately 2.5 mm and said edge of said support member protrudes inwardly of said insertion vent hole between 0.5 and 0.7 mm.

* * * * *